United States Patent [19]

Denney et al.

[11] Patent Number: 5,163,773
[45] Date of Patent: Nov. 17, 1992

[54] SELF-LOCKING BALL-AND-SOCKET MECHANISM

[75] Inventors: Omer C. Denney; James D. Keaton, both of Dayton; David E. Staeuble, Kettering; Larry C. A. Studebaker, Englewood; William L. Van Doren, Dayton, all of Ohio

[73] Assignee: General Motors Corporation, Detroit, Mich.

[21] Appl. No.: 712,029

[22] Filed: Jun. 7, 1991

[51] Int. Cl.⁵ ............................................ F16C 11/08
[52] U.S. Cl. ...................................... 403/133; 403/140
[58] Field of Search ............... 403/133, 140, 135, 122, 403/76; 384/203, 206–209; 29/898.043, 898.044, 898.047

[56] References Cited

U.S. PATENT DOCUMENTS

| | | | |
|---|---|---|---|
| 4,194,850 | 3/1980 | Cranmore | 403/140 |
| 4,318,627 | 3/1982 | Morin | 403/133 |
| 4,650,363 | 3/1987 | Kehl et al. | 403/140 |
| 4,714,477 | 12/1987 | Fichera et al. | 403/135 X |

Primary Examiner—Randolph A. Reese
Assistant Examiner—Harry C. Kim
Attorney, Agent, or Firm—Ernest E. Helms

[57] ABSTRACT

A push rod is connected in pivotal retained relation to a member such as a power booster air valve or a master cylinder piston by an insert. The insert is fitted on the spherical ball end of the push rod and the insert with the push rod is then inserted into a recess in the member. The insert has a plurality of arms extending from the insert base end at a slight angle outwardly relative to the insert axis. The arms and the member recess are provided with various cam surfaces which force the arms inwardly in cantilever fashion during the insertion movement, and the arms have surfaces on their outer ends which fit within an annular groove in the cylindrical side wall of the member recess, locking the insert to the rod spherical ball end and also within the member recess.

3 Claims, 1 Drawing Sheet

SELF-LOCKING BALL-AND-SOCKET MECHANISM

FIELD OF THE INVENTION

The invention relates to mechanisms which have a ball-and-socket relationship of parts, and more particularly to such mechanism in which the ball end of a push rod or the like is inserted into a member and is secured in place at the completion of the insertion without requiring any staking or other completion of the assembly by installation of retainers such as pins or clips. It is particularly applicable to brake and clutch mechanisms such as master cylinders and power boosters.

BACKGROUND OF THE INVENTION

Master cylinders and power boosters such as those commonly used in brake and clutch systems are usually actuated by means of a push rod connected to be actuated in the apply direction by a pedal. The push rod, having one end connected to a pedal arm which swings in an arc about a pedal pivot, has that end moving pivotally in a plane as well as axially as the pedal is pressed. The other end usually has a ball end on it and is attached to a master cylinder piston or a power booster control valve which moves axially in a cylinder. Thus that rod other end is restricted to linear movement along the axis of that cylinder. For this reason, that rod other end is commonly made with a ball end which fits in a socket in the master cylinder piston or the power booster control valve, the arrangement being such that the necessary pivotal movement of the rod is accommodated.

The ball end of the rod is retained in the piston or valve in any of several manners. One example is that of staking the ball in place by a staking operation in which one or more parts of the power booster valve are displaced radially inward so that a permanent barrier to removal of the rod is provided. The rod ball end engages that staked barrier when the rod is subjected to tension force tending to retract the rod from the valve, thus moving the valve with any attempted retracting movement of the rod. This has an advantage of simplicity and no additional parts, but has disadvantages in that the rod cannot be removed while leaving the valve intact; the staking process cannot be sufficiently accurate to obtain the depth of staking needed along with the location of the staked valve material so that there is a minimum looseness in fit between the rod ball end and the valve but not a binding fit between them. This staking arrangement has been used in power brake boosters, particularly of the vacuum suspended type in which the push rod is secured to the air valve of the booster, for many years. U.S. Pat. No. 3,068,842, entitled, "Brake Booster Unit" and issued Dec. 18, 1962 to Frank W. Brooks shows the staking arrangement in an air suspended power booster.

This arrangement and other typical arrangements for securing the ball end in place are shown in various ones of the following U.S. Pat. Nos.:

U.S. Pat. No. 3,050,035, entitled, "Brake Booster Valve" and issued Aug. 21, 1962 to Carl E. Wilkins et al;

U.S. Pat. No. 3,052,130, entitled, "Pedal Connection" and issued Sept. 4, 1962 to George E. Kellogg et al;

U.S. Pat. No. 3,350,882, entitled, "Vehicle Braking System" and issued Nov. 7, 1967 to Maurice B. Leising;

U.S. Pat. No. 3,410,178, entitled, "Valve Means for a Fluid Pressure Servomotor" and issued Nov. 12, 1968 to Oswald O. Kytta;

U.S. Pat. No. 3,733,822, entitled, "Dual Ratio Force Transfer Apparatus" and issued May 22, 1973 to William E. Monroe;

and U.S. Pat. No. 3,807,280, entitled, "Servo Motors" and issued Apr. 30, 1974 to Ronald F. Green et al.

It is to be understood that these patents are merely typical of the arrangements being used or otherwise forming a part of the prior art, and that there are a multitude of patents disclosing master cylinders, power boosters and other mechanisms with such arrangements.

U.S. Pat. No. 3,050,035 shows a metal clip which fits in ball-and-socket relation about the enlarged ball end of the push rod and then is press fitted into the bore of the air valve member of the booster.

U.S. Pat. No. 3,052,130 discloses a push rod extending forwardly into an opening extending on the rearward end of the master cylinder piston. The push rod has a groove behind its spherical end which is engaged by a retainer ring through which the end of the push rod was extended. The retainer ring appears to be a hollow rubber cone with the top of the cone removed so that the push rod extends through it, the retainer ring having been earlier installed in the piston opening.

U.S. Pat. No. 3,350,882 discloses a plunger having a bore which receives a relatively resilient retainer (which in common production practice is a synthetic rubber retainer) installed in the bottom end of the bore. The generally spherical ball end of the brake pedal rod is received in the resilient retainer. A cup-like retainer (illustrated as a metal retainer) is illustrated as being fitted over the brake pedal rod so that it is smaller than the ball end of the rod and engages the resilient retainer. The cup-like retainer is tightly fitted (apparently a press fit) into the bore of the plunger and serves to retain the resilient retainer in the position illustrated.

U.S. Pat. No. 3,410,178 shows the staking arrangement discussed above. This patent and U.S. Pat. No. 3,733,822 also show the same type of retainer as that in U.S. Pat. No. 3,350,882 discussed above.

U.S. Pat. No. 3,807,280 illustrates and describes a valve member having a threaded recess with a thrust member threaded into it and abutting a shoulder in the recess. The ball end of the push rod fits in a hemispherical socket in the thrust member and a split ring collar surrounds the push rod just behind the ball end. The collar has a part-spherical inner configuration which frictionally engages the push rod ball end. An inner member is also threaded into the recess, engaging the split ring so as to hold it in frictional engagement with the push rod ball end.

SUMMARY OF THE INVENTION

The invention herein disclosed and claimed includes an insert having a plurality of angularly extending resilient cantilever spring arms in its free position, the insert being installed over the ball end of the push rod and then being inserted into a recess in one end of a piston or valve or other member to be actuated by the push rod. The insert arms are partially collapsed by camming action as it is pushed into the recess until the arms enter the recess. Flange segments on the free ends of the arms then snap outwardly by spring action of the arms when they enter a groove in the recess. The end walls of the flange segments engage a shoulder and a mating camlike surface forming the side walls of the groove, blocking removal of the push rod ball end and retaining the push rod in position. The interior of the insert has a partspherical surface engaging the ball end in compression force transmittal relation, and the arms have segmental part-spherical surfaces which also engage the ball end. They receive, in compression, any tension forces tending to move the push rod out of the recess.

Broadly a description of structure embodying the invention is that of a self-locking ball-and-socket mechanism comprising a member having an axially extending recess formed therein, the member having a push rod operatively pivotally attached thereto in its recess. The push rod has an enlarged ball end operatively secured in the recess of the member to provide operative pivotal attachment of the push rod to the member. An insert has a socket formed therein receiving the push rod enlarged ball end therein in pivotal relation. It also has first means thereon cooperating with the push rod enlarged ball end to receive that ball end in the insert socket in ball-and-socket relation and hold the push rod in the insert so that the push rod is limited to only pivotal movement relation relative to the insert. The insert and the member further have second means cooperatively acting to cause the insert socket to engage the ball end in such limited pivotal movement relation and to lock the insert in the member recess as to retain the insert and the push rod ball end in the member recess with the push rod being in operative pivotal movement relation to the member and being restricted against axial movements in relation to the member.

Somewhat more specifically, the self-locking ball-and socket mechanism insert includes a base end and a plurality of circumferentially spaced arms extending axially and radially outward from the base end. The first means is defined by spherical segment surfaces on the base end and the inner surfaces of said arms cooperatively forming a socket for the push rod ball end.

Still more specifically, the self-locking ball-and-socket mechanism second means includes cam surfaces formed on the insert and the member and a shoulder formed on each of the insert and the member. Some of the cam surfaces cause the insert socket to engage the ball end as above described. The shoulders become engaged axially of the member and the insert. Some of the cam surfaces and the engaged shoulders lock the insert in the member recess as earlier described.

A still more specific description of structure embodying the invention is that of a self-locking ball-and-socket mechanism comprising a rod having a ball end; an axially extending member to which the rod ball end is to be connected in pivotal ball-and-socket relation for the transmittal therebetween of compression and tension forces while maintaining pivotal ball-and-socket relation; the member having an axially extending recess formed therein which has an inner end defined by an end wall, an outer end defining an opening, and a cylindrical side wall connecting the recess inner and outer ends; an internal annular groove formed in the cylindrical side wall axially adjacent the recess outer end, the annular groove having first and second groove side walls and a groove base wall connecting the groove side walls, the groove first side wall defining an annular shoulder which is substantially perpendicular to the axis of the member's recess, and the groove second side wall being axially spaced toward said recess inner end wall from the groove first side wall and defining a first annular frusto-conical cam surface having its larger diameter end at the juncture of the second side wall with the annular groove base wall and its smaller diameter end at the juncture of the annular groove second side wall with the recess cylindrical side wall; a portion of the recess cylindrical side wall between the annular groove and the recess opening being formed to provide a second annular frusto-conical cam surface having its smaller diameter positioned adjacent to but axially spaced from the annular groove first side wall and its larger diameter defining the recess outer end opening. An insert is arranged to be placed over the rod ball end and then inserted into the member's recess to lock the rod ball end, and therefore the rod, in place in the recess in pivotal relation to the member. The insert comprises a cylindrical base end having axially spaced inner and outer end surfaces and a peripheral outer surface connecting the inner and outer surfaces, the diameter of the peripheral outer surface of substantially the same as, but no greater than, the diameter of the part of the recess cylindrical side wall between the recess end wall and the annular groove, the base end inner end surface having a spherical-segment depression therein which is coaxial with the base end peripheral outer surface and which is adapted to be engaged by a spherical portion of the rod ball end; and a plurality of circumferentially spaced resilient arms extending in cantilever relation from the base end in approximately 13 degrees angular opening relation. Each of the insert arms has an outwardly extending flange segment defining the arm end thereof opposite the base end of the insert, and an arm segment connecting the arm flange segment to the base end and having an arm outer surface. Each of the arm flange segments has an outer end surface, an outer peripheral surface, an inner peripheral surface, and an inner end surface, the outer end surface being substantially perpendicular to the outer peripheral surface, the inner end surface being formed as a frusto-conical segment cam surface, and the inner peripheral surface being a frusto-conical segment rod clearance surface. The arm segment of each of said arms has a spherical segment toroidally formed surface adapted for socket-engagement with the rod ball end after installation of the insert and the rod in the member. Each of the spherical segment toroidally formed surfaces has the diameter of its edge located axially away from the insert base end being less than the diameter of the rod ball end and greater than the diameter that part of the rod beyond the rod ball end. That edge of each of the spherical segment toroidally formed surfaces is expandable by insertion of the rod ball end therethrough to permit axial passage of the rod ball end past those edges. The base end inner end surface spherical segment depression and the spherical segment toroidally formed surfaces are adapted to cooperatively act to retain the insert on the rod ball end when the rod ball end is inserted therein and receives the insert arms about it. When the insert and the rod ball end are being inserted therein as above described, being moved to be axially inserted into the member axially extending recess through the recess opening, the arm segment outer surfaces are engaged by the second frusto-conical cam surface. As insertion movement is continued the arms are cammed to bend inwardly in cantilever spring fashion at their base ends so that the insert base end and the arm segment outer surfaces are received within the member recess with the arm flange segment first frusto-conical cam surface segments engaging the second frusto-conical cam surface in camming relation and moving radially inwardly so that the arm flange segments clear the annular groove shoulder. The arms being urged outwardly by their cantilever spring action, their flange segments snap into the annular groove with the first frusto-conical cam surface segments being in mating engagement with the annular groove inner end wall and the flange segment outer end surfaces being in abutting engagement with the annular groove shoulder, at which time the insert base end outer wall is in surface engagement with the recess inner end. The insert and the rod ball end then are then axially locked in the member axial recess with the rod being permitted limited pivotal movements about its ball end relative to the insert and the member.

DETAILED DESCRIPTION

Figure 1:
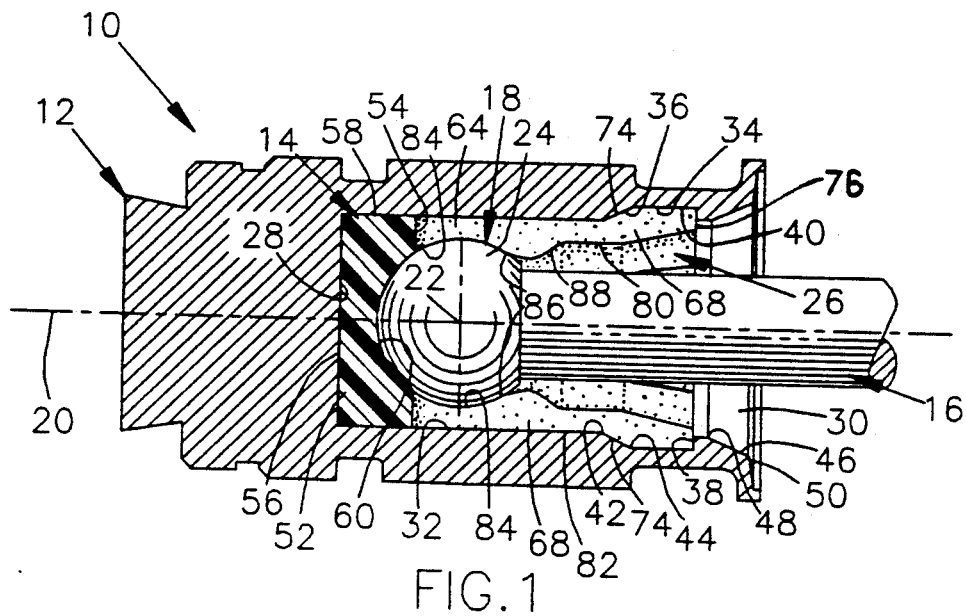
FIG. 1 is a fragmentary cross section view of a power booster air valve assembly, illustrating the preferred embodiment of relevant portions of the self-locking ball-and-socket mechanism embodying the invention.
Figure 2:
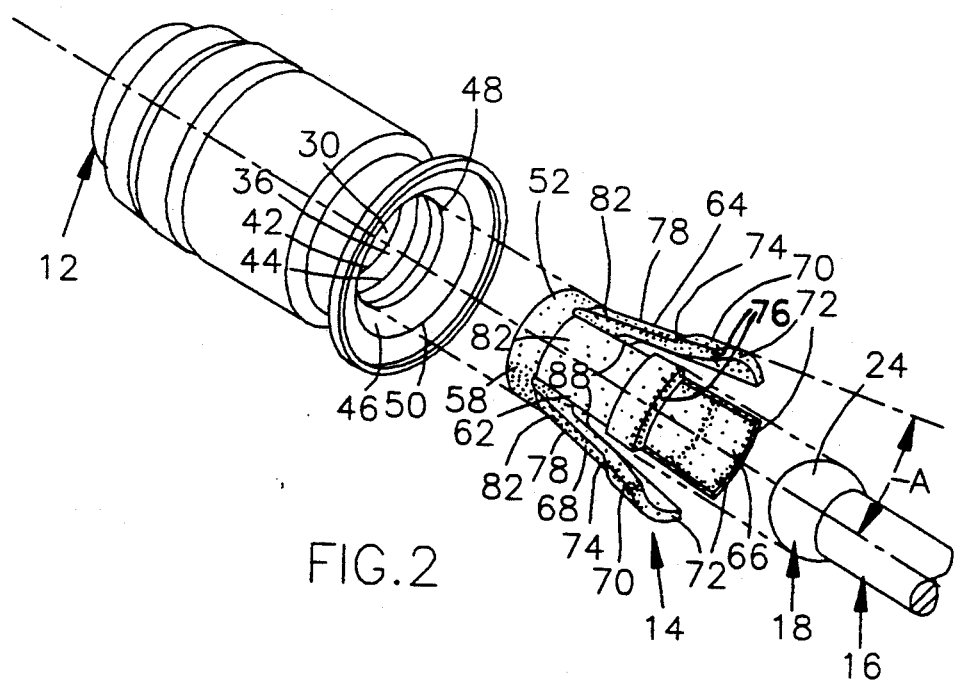
FIG. 2 is an exploded perspective view of the mechanism of FIG. 1 showing the relationship of the various elements of the invention before assembly is begun.

The self-locking ball-and-socket mechanism 10 of FIG. 1 includes an axially extending member 12 illustrated in this preferred embodiment as the air valve of a vacuum-suspended power booster. It is to be understood that mechanism 10 may have other functions and uses, and the member 12 is not limited to such a valve or to a master cylinder piston. It may readily be adapted to other arrangements which require a ball-and-socket arrangement without departing from the invention.

Mechanism 10 further includes an insert 14 and a push rod 16. The push rod has a spherical ball end 18 which is larger in diameter than the diameter of the part of the push rod adjacent the ball end 18. The function of the push rod 18 in the particular environment shown is to move the member 12, illustrated as the air valve of a power booster, leftwardly as seen in FIG. 1 to actuate the booster. Upon deactuation of the booster, the apply force being exerted on and through the push rod as a compression force to the member 12 is released.

The member 12 may at that time be moved rightwardly as seen in FIG. 1 to move the push rod rightwardly, or at times the push rod may be moved rightwardly so that a tension force is exerted through it to the member 12. In either instance it is desirable that the push rod ball-and-socket connection remain connected as shown so that there is no excess tolerance creating poor control of the device being controlled or moved by the member 12 while still providing for pivotal movements of the push rod relative to the member 12.

Member 12 has a longitudinal axis 20. When the rod 16 and the insert 14 are installed in member 12 as shown in FIGURE I, the center 22 of the spherical surface 24 of the rod ball end 18 and the longitudinal axis of insert 14 lie on and are coincident with axis 20. Thus for purposes of description with simplicity their axes are also identified as axis 20. When the rod 16 is in axial alignment with member 12 and insert 14, its axis is also coincident with axis 20.

Member 12 has an axially extending recess 26 formed therein. Recess 26 has an inner end defined by the recess end wall 28, a substantial portion of which is perpendicular to axis 20. Recess 26 also has an outer end defining an opening 30, and a cylindrical side wall 32 which connects the recess inner and outer ends. An internal annular groove 34 is formed in the recess side wall 32 axially adjacent the recess outer end opening 30. Groove 34 has a first side wall 36 and a second side wall 38 axially spaced from wall 36. These groove side walls are connected by the groove base wall 40. Side wall 36 is axially spaced toward the recess end wall 28 relative to the side wall 38 and defines a first annular frustoconical cam surface, also 36 since they are coextensive. This cam surface 36 has its larger diameter end 42 at the juncture of the side wall 36 and the groove base wall 40. Its smaller diameter end 44 is located at the juncture of the side wall 36 and the recess cylindrical side wall 32. Side wall 38 is substantially perpendicular to the axis 20 so that it forms an annular abutment or shoulder, also 38 since they are coextensive.

A portion of the recess cylindrical side wall 32 located axially between the annular groove 34 and the recess opening 30 is formed to provide a second annular frusto-conical cam surface 46. This cam surface has its larger diameter end 48 defining the recess outer end opening 30. Its smaller diameter end 50 is positioned adjacent to but axially spaced from the groove second side wall 36.

The insert 14 is preferably made of a hard but flexible plastic such as nylon. A satisfactory nylon used for in successful testing has the following material properties:

| Young's modulus | 1207 MPa |
|---|---|
| Poisson's Ratio | 0.35 |
| Tensile Yield Strength | 58.6 MPa |
| Specific Gravity | 1.14 |
| Percent Elongation | 25% |

The insert may also be made of other appropriate plastics or metals which have sufficient resilience or spring in the insert arms to flex as later described without damage to the insert, and which do not spread or extrude excessively under normally expected tension and compression loads plus a safety factor when such loads are placed on it through the push rod.

The insert 14 is arranged to be Placed over the rod ball end 18. The insert and the rod ball end are then inserted into the recess opening 30 and moved axially into the recess 26 until they reach the position shown in FIGURE I. At that time the insert 14 locks the rod ball end in place in the recess 26 with the rod 16 being in pivotal relation to the member 12 and insert 14 about the center 22 of the rod ball end.

Insert 14 has a cylindrical base end 52. Base end 52 has axially spaced inner and outer end surfaces 54 and 56 and a peripheral outer surface 58 connecting the end surfaces 54 and 56. End surface 56 is substantially parallel to the end wall 28. The diameter of the peripheral outer surface 58 is such that the insert slides into the recess cylindrical side wall 32 until its base end outer end surface 56 is in surface engagement with the recess end wall 28, but there is no noticeable lateral play of the insert in the recess. Thus this diameter is substantially the same as but no greater than the diameter of the recess cylindrical side wall 32. The base end inner end surface 54 has a spherical-segment or part-spherical depression 60 formed in it coaxially on axis 20 of the insert 14. Depression 60 is arranged to be in ball-and-socket surface engagement with a spherical portion of the rod ball end 18 when the mechanism 10 is assembled as shown in FIG. I.

Insert 14 has a plurality of circumferentially spaced resilient arms 62, 64, 66 and 68 extending in cantilever relation from base end 52. When the insert 14 is made of the nylon plastic noted above, the arms preferably extend slightly outward at an angle A of about 13 degrees to the axis of the insert. Angle A may vary to some extent with this material, usually within a range of about 8 degrees to about 18 degrees. With other materials angle A may be somewhat different from this range and still be within an acceptable range. Therefore the value of that outward angle A is determined by the characteristics of the material as used in the particular insert and the angle A of about 13 degrees, with the angle A range of about 8 degrees to about 18 degrees, as stated herein may be modified within the scope of the invention as disclosed and claimed to take that into account and permit the needed arm movements during installation. The arms must be able to be angularly expanded from their free positions sufficiently to let the rod ball end move into engagement with the depression 60 without damage to the insert. They must then recover toward their free positions and afterward be able to be cammed by cooperating cam surfaces on them and on the cylindrical side wall of recess 26 into their positions which are substantially parallel to the axis of the insert when the insert is in its installed position shown in FIG. 1.

Since all of the insert arms 62, 64, 66 and 68 are identical, only one set of reference characters will be used in describing their details. Each of the insert arms has a radially outwardly extending flange segment or lip 70 defining the free arm end 72 which is opposite the insert base end 52. The flange segment 70 has its side wall 74 on the side thereof toward the insert base end 52 formed to provide a third cam surface, also 74, which is arranged to mate with the cam Surface 36 when the insert is installed in recess 28. The other side wall 76 of flange segment 70 is formed to define a shoulder, also 76, which is matable with the shoulder formed by groove side wall 38.

An arm segment 78 connects the arm flange segment 70 to the base end 52. Arm segment 78 has an inner surface 80 and a cylindrical segment outer surface 82. Surface 82 is matable with the portion of the recess cylindrical side wall 32 which is axially intermediate recess end wall 28 and internal groove 34. The arm segment 78 has a spherical band segment surface 84 which is adapted for mating surface socket-engagment with a portion of the rod spherical ball end 18 so that, when all of the surfaces 84 are so engaged with the rod ball end, the ball end is effectively retained within the insert 14 against substantially all movements relative to the insert other than pivotal movements about the center 22 of the rod ball end. The surfaces 84 are so engaged with the spherical surface 24 rod ball end 18 while the insert and rod are installed in the member 12 as shown in FIG. 1. To assure such retention, each surface 84 has the diameter of its edge 86 that is located axially away from the insert base end 52 of lesser diameter than the diameter of the rod ball end spherical surface 24. In order that the rod 16 may pivot to a reasonable desired extent, the diameter of the arc forming surface edge 86 is also sufficiently greater than the diameter of that part of rod 16 which is axially beyond the rod ball end spherical surface 24 to permit such pivotal movement of rod 16. The portion of each arm segment inner surface 80 axially adjacent each surface edge 86 is formed to provide a fourth cam surface 88. This cam surface is engaged by the ball end spherical surface 24 of rod 16 when the rod is moved axially into insert 14 so that further axial movement in that direction cams the arms 62, 64, 66 and 68 outwardly as earlier described until the effective opening formed by all of the surface edges 86 is sufficiently large to let the rod ball end pass beyond edges 86 and engage depression 60 and the surfaces 84 to some extent. In the free state the arms then spring back inwardly so that the surface edges 86 again form an effective opening which is less than the diameter of the ball end spherical surface 24 of rod 16, and the insert 14 is retained on the rod 16.

When the insert 14, with the rod ball end inserted therein and retained thereon, is axially inserted into recess 26 of member 12 through the recess opening 30, the arm segment outer surfaces 82 of the arms 62, 64, 66 and 68 are initially engaged by the cam surface 46. As insertion movement is continued, the arm segments 78 are cammed inwardly to bend said arms 62, 64, 66 and 68 in cantilever fashion at their juncture with the insert base end 52. Continued axial insertion movement of the insert 14 and the rod 16 causes the third cam surface 74 of each flange segment 70 to engage the cam surface 46, forcing the arm flange segments 70 sufficiently inward so that the arm flange segments pass through and beyond the shoulder formed by the groove side wall 38. When the shoulders 76 of arm flange segments 70 clear the shoulder formed by groove side wall 38, the spring action of the cantilever arms moves the flange segments 70 outwardly into the groove 34. The shoulders 76 engage the shoulder formed by the groove side wall 38 in abutting relation, and the third cam surfaces 74 engage the first cam surface 36 in surface engaging relation. During the camming movements of the arms as above described occurring as the insert 14 and rod 16 are being installed, the spherical band segment surfaces 84 of the arms move to fully engage, and then more tightly engage, the spherical surface 24 of ball end 18 as the arms are moved inwardly. The tighter engagement occurs while the flange segments 70 are being cammed further inward so as to pass over the shoulder formed by side wall 38. When the arm flange segments 70 move slightly back outwardly into the groove 34, the spherical band segment surfaces 84 again fully engage, but do not so tightly engage, the spherical surface of the ball end. The spherical band segment surfaces 84 are not so tightly engaged with the spherical surface of the ball end that the ball end cannot pivot in the socket formed by the depression 60 and the spherical band segment surfaces.

When it is necessary to separate the member 12 and the rod 16, it is sometimes possible to use a small pick-like tool to force the arm outer ends inwardly so that they clear the shoulder formed by the groove side wall 38, at which time the insert 14 may be retracted by tension force exerted on the rod 16. Otherwise, sufficient tension force must be exerted between the push rod 16 and the member 12 to cause the insert to fail and permit removal of the rod. This amount of tension force is well beyond that to which the rod may be normally exposed, even during installation and connection of a pedal to the rod, for example. The insert retains the rod in position in the member 12 under all normal operating conditions.

What is claimed is:

1. A self-locking ball-and-socket mechanism comprising:

a member with a longitudinal axis having an axially extending recess formed therein, said recess having an end wall with a substantial portion of which is perpendicular to said axis, said member having a push rod operatively pivotally attached thereto in said recess;

said push rod having an enlarged ball end operatively secured in said recess to provide said operative pivotal attachment of said push rod to said member;

and an insert having a socket formed therein receiving said push rod enlarged ball end therein in pivotal relation and having first means thereon comprising with said push rod enlarged ball end to receive said ball end in said insert socket in ball-and-socket relation and hold said push rod in said insert so that it is limited to pivotal movement relation only relative to said insert, said insert and said member further having second means cooperatively acting to cause said insert socket to engage said ball end in such limited pivotal movement relation and said insert being so locked in said member recess as to retain said insert and said push rod ball end in said member recess with said push rod in operative pivotal movement relation to said member, and said push rod being restricted against axial movements in relation to said member, and wherein said insert includes a base end and a plurality of circumferentially spaced arms extending axially and radially outward from said base end, said first means being spherical segment surfaces on said base end and the inner surfaces of said arms cooperatively forming a socket for said push rod ball end;

and in which said second means includes cam surfaces formed on said insert and said member and a shoulder formed on each of said insert and said member, some of said cam surfaces causing said insert socket to engage said ball end as aforesaid and said shoulders being engaged axially of said member and said insert and with some of said cam surfaces locking said insert in said member recess as aforesaid, and said insert base and having an outer end surface substantially parallel to the end wall in surface engagement with said recess end wall.

2. A self-locking ball-and-socket mechanism comprising:

an axially extending member having an axially extending recess in one end, said recess having an end wall at one end and a chamfered opening at the other end forming a first cam surface, an internal groove adjacent to but axially spaced from said chamfered opening, said groove having the side wall thereof nearer said chamfered opening formed as a first shoulder and the side wall nearer said end wall being chamfered to form a second cam surface;

a rod having longitudinal body and a ball end formed on one end of said longitudinal body, said ball end having a Spherical outer surface of greater diameter than the diameter of said rod longitudinal body;

and a generally cap-shaped axially extending insert formed to provide a base and a plurality of cantilever spring arms extending axially and radially outwardly from said insert base, said base having a spherical segment depression formed therein which is of a radius commensurate with the radius of said rod ball end spherical outer surface so as to provide a partial socket for said rod ball end, said arms having fixed ends at said base and free ends which when free of constraint are radially spaced further from the axis of said insert than said fixed ends, said free ends each having a lip formed thereon extending generally radially outwardly relative to the axis of said insert, each of said lips having one axial side a surface forming a second shoulder and on the other axial side a chamfered surface forming a third cam surface;

said arms further having segmental spherical surfaces on the inner sides thereof adjacent said insert base and in spaced relation with said insert base spherical depression to form therewith a socket for receiving and pivotally retaining said rod spherical ball end, and still further having fourth cam surfaces formed on the inner sides thereof adjacent to said segmental spherical surfaces on the opposite sides therefrom relative to said insert base;

said rod ball end being inserted into said insert with said insert arms fourth cam surfaces being engaged with parts of said rod ball end spherical outer surface in camming relation so that said arms are cammed outwardly from their constraint-free positions until said arm segmental spherical surfaces and said insert base spherical segment depression receive said rod ball end spherical outer surface in ball-and-socket relation, said insert and said rod ball end then being inserted in said member axially extending recess with the insert base being first inserted, so that said arms engage said first cam surface and as insertion is continued said arms are cammingly forced cantileverly inwardly and said arm third cam surfaces engage said first cam surface forcing said arm free ends inwardly to permit said arm lips to move axially beyond said first cam surface and then laterally outward into mating engagement with said groove walls with said first and second shoulders in engagement with each other and said second and third cam surfaces in engagement with each other and said arm spherical segment surfaces in spherical surface engagement with said rod ball end spherical outer surface and holding said rod ball end in axially restricted but pivotally movable relation to said insert and said axially extending member, said first and second shoulders and said second and third cam surfaces being so engaged as to lock said rod ball end and said insert against axial movements in said member axially extending recess.

3. A self-locking ball-and-socket mechanism comprising:

a rod having a ball end;

an axially extending member to which said rod ball end is to be connected in pivotal ball-and-socket relation for the transmittal therebetween of compression and tension forces while maintaining said pivotal ball-and-socket relation; said member having an axially extending recess formed therein, said recess having an inner end defined by an end wall, an outer end defining an opening, and a cylindrical side wall connecting said recess inner and outer ends;

an internal annular groove formed in said cylindrical side wall axially adjacent said recess outer end, said annular groove having first and second groove side walls and a groove base wall connecting said groove side walls, said groove first side wall defining an annular shoulder which is substantially perpendicular to the axis of said recess, and said groove second side wall being axially spaced toward said recess inner end wall from said groove first side wall and defining a first annular frusto-conical cam surface having its larger diameter end at the juncture of said first side wall with said annular groove base wall and its smaller diameter end at the juncture of said annular groove second side wall with said recess cylindrical side wall;

a portion of said recess cylindrical side wall between said annular groove and said recess opening being formed to provide a second annular frusto-conical cam surface having its smaller diameter end positioned adjacent to but axially spaced from said annular groove first side wall and its larger diameter end defining said recess outer end opening;

and an insert arranged to be placed over said rod ball end and then inserted into said recess to lock said rod ball end, and therefore said rod, in place in said recess in pivotal relation to said member, said insert comprising:

a cylindrical base end having axially spaced inner and outer end surfaces and a peripheral outer surface connecting said inner and outer surfaces, the diameter of said peripheral outer surface of substantially the same as, but no greater than, the diameter of the part of said recess cylindrical side wall between said recess end wall and said annular groove, said base end inner end surface having a spherical-segment depression therein which is coaxial with said base end peripheral outer surface and which is adapted to be engaged by a spherical portion of said rod ball end;

and a plurality of circumferentially spaced resilient arms extending in cantilever relation from said base end in approximately 13 degrees angular opening relation;

each of said insert arms having an outwardly extending flange segment defining the arm end thereof opposite said base end, and an arm segment connecting said arm flange segment to said base end and having an arm outer surface;

each of said arm flange segments having an outer end surface, an outer peripheral surface, an inner peripheral surface, and an inner end surface, said outer end surface being substantially perpendicular to said outer peripheral surface, said inner end surface being formed as a frusto-conical segment cam surface, and said inner peripheral surface being a frusto-conical segment rod clearance surface;

said arm segments of each of said arms having a spherical band segment surface adapted for socket-engagement with said rod ball end after installation of said insert and said rod in said member, each of said spherical segment toroidally formed surfaces having the diameter of its edge located axially away from said insert base end being less than the diameter of said rod ball end and greater than the diameter that part of said rod beyond said rod ball end and expandable by insertion of said rod ball end therethrough to permit axial passage of said rod ball end therepast;

said base end inner end surface spherical-segment depression and said spherical band segment surfaces being adapted to cooperatively act to retain said insert on said rod ball end after said rod ball end is inserted therein and so as to receive spherical band surfaces of said arms thereabout;

and, when said insert with said rod ball end being inserted therein as aforesaid is moved to be axially inserted into said member axially extending recess through said recess opening, said arm segment outer surfaces are engaged by said second frusto-conical cam surface and as insertion movement is continued are cammed to bend said arms in cantilever spring fashion to receive said base end of said insert and said arm segment outer surfaces within said member recess with said arm flange segment first frusto-conical cam surface segments engaging said second frusto-conical cam surface in camming relation and moving radially inwardly so that said arm flange segments clear said annular groove shoulder and, by the cantilever spring action urging said arms outwardly, said arms then snap into said annular groove, said first frusto-conical cam surface segments then being in mating engagement with said annular groove inner end wall and said flange segment outer end surfaces then being in abutting engagement with said annular groove shoulder and said insert base end outer wall then being in surface engagement with said recess inner end, said insert and said rod ball end then being axially locked in said member axial recess with said rod being permitted limited pivotal movements about its ball end relative to said insert and said member.

* * * * *